United States Patent [19]
Yeung

[11] Patent Number: 4,654,917
[45] Date of Patent: Apr. 7, 1987

[54] COMPACT DISC CLEANER

[75] Inventor: Choi K. Yeung, Hong Kong, Hong Kong

[73] Assignee: Recoton Corporation, Long Island City, N.Y.

[21] Appl. No.: 745,672

[22] Filed: Jun. 17, 1985

[51] Int. Cl.⁴ .......................... G11B 3/58; B08B 11/02
[52] U.S. Cl. ........................ 15/97 R; 134/6; 369/72
[58] Field of Search ................... 15/97 R, 21 R, 21 C; 369/72; 134/6; 360/137

[56] References Cited

U.S. PATENT DOCUMENTS

| | | | |
|---|---|---|---|
| 2,563,701 | 8/1951 | Ajero | 369/72 X |
| 3,421,168 | 1/1969 | Bartel | 15/21 R |
| 4,556,433 | 12/1985 | Clausen | 15/97 R X |
| 4,561,142 | 12/1985 | Mischenko et al. | 15/97 R |
| 4,569,098 | 2/1986 | Kawabe | 369/72 X |

FOREIGN PATENT DOCUMENTS 666242  2/1952  United Kingdom ............... 15/97 R

Primary Examiner—Edward L. Roberts
Attorney, Agent, or Firm—Curtis, Morris & Safford

[57] ABSTRACT

Cleaning apparatus for a compact disc comprises a housing, a rotatable carrier disposed in the housing, a cleaning pad fastened to the carrier for contacting the surface of the compact disc, a drive wheel for driving the carrier to rotate the latter about an axis of rotation and concurrently to cause that axis of rotation to move along a predetermined path, and a constraint for constraining that path of movement to a curved path, whereby the carrier and its cleaning pad exhibit planetary movement of both rotation and revolution.

24 Claims, 6 Drawing Figures

FIG.2
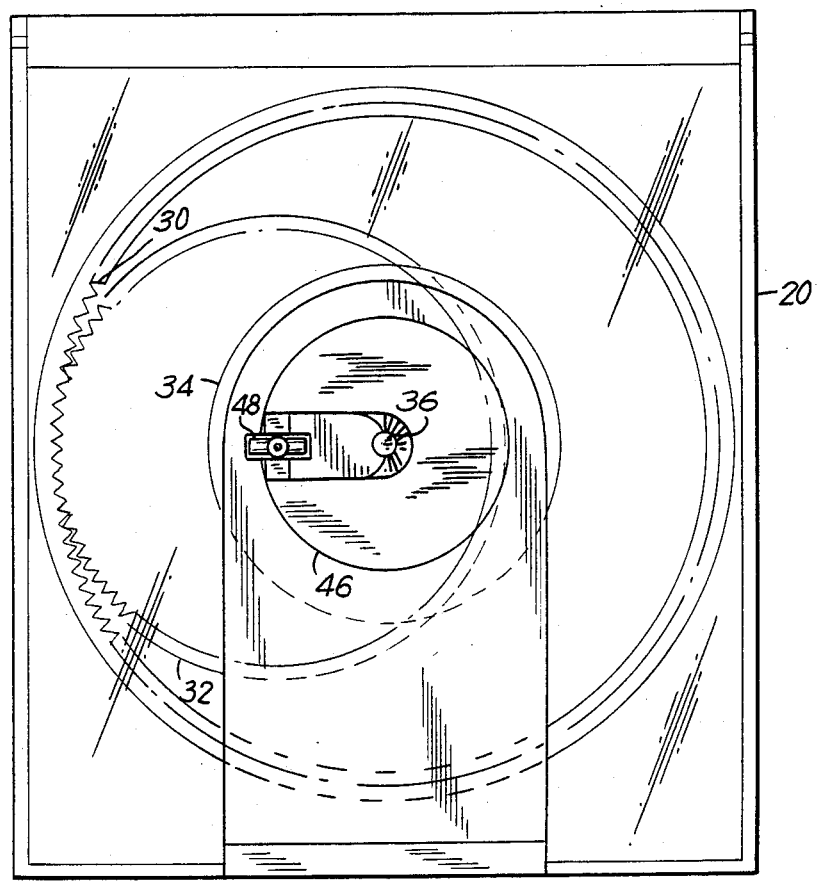
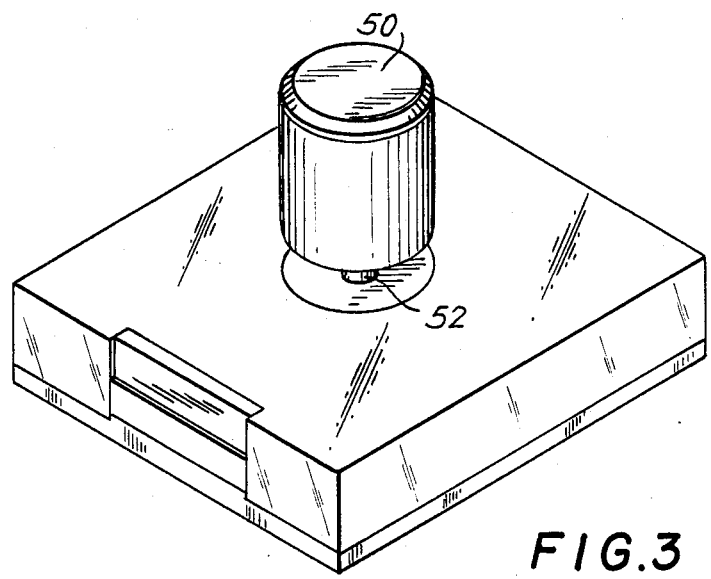
FIG.3

COMPACT DISC CLEANER

BACKGROUND OF THE INVENTION

This invention relates to a record cleaner and, more particularly, to a compact disc cleaner that provides good mechanical cleaning of a compact disc.

The recent introduction of the so-called compact disc has resulted in a marked improvement in the quality of reproduced sound, such as music, from what broadly may be called a phonograph record. A conventional compact disc is provided with a surface having "pits" and "lands" arranged in concentric circular tracks, these pits and lands representing digital information that, in turn, constitutes a digitized version of sound. Digital signals are reproduced from the compact disc by scanning its surface with a suitable source of light, typically, a laser beam.

Briefly, the scanning light beam (e.g. the laser) is focused just below the surface of the disc which, typically, is polished and may be, for example, aluminum. The laser beam is reflected from the surface of the disc and is modulated by the pits and lands which it scans. The modulated beam is detected; and the digital information represented by such modulation is decoded and converted to sound. By focusing the laser beam just below the surface of the disc, slight imperfections on the surface of the disc, such as scratches, neither cause nor affect the modulations in the reflected beam. Moreover, since no mechanical elements are brought into contact with the surface of the disc, the disc is not subjected to wear and, in theory, there is no practical limit on the number of times that disc may be replayed. This contrasts with typical contemporary phonograph systems in which a phonograph needle rides in a spiral groove of the phonograph disc resulting in wear on both the groove and the needle, as well as wear on the pick-up cartridge that is used with that needle, thereby limiting the longevity of the phonograph disc and pick-up transducer.

Notwithstanding the generally good resistance of the optically readable compact disc to sound distortion caused by imperfections in the surface of the disc, as aforementioned, perturbations may be imparted to the scanning laser beam, resulting in sound distortion, due to fingerprints, oil and soil adhering to the surface of the disc. Accordingly, it is a recognized objective to provide some form of cleaning apparatus by which the surface of the compact disc may be wiped to remove or at least reduce the aforementioned impairments from the disc. However, in view of the sensitivity of the disc to potential damage, devices that have been used heretofore in the cleaning of phonograph records cannot be used to clean compact discs. One proposal to clean the surface of the compact disc requires a user to manually wipe the surface of the disc with a hand-held cleaning pad subsequent to the application to that surface of a suitable cleaning spray. This cleaner is available from Nagaoka & Company from Japan.

However, such manual cleaning apparatus is less than perfect. Notwithstanding cautionary instructions that are provided therewith, it is expected that different users will manipulate the cleaning pad in different fashions, resulting in varied results, including the possibility of seriously damaging the compact disc. Also, although the manual cleaning of a compact disc does not appear to be an arduous task, it is expected that, in the absence of some automatic cleaning device, several users will wish not to be bothered with manual cleaning.

OBJECTS OF THE INVENTION

Therefore, it is an object of the present invention to provide automatic cleaning apparatus for a compact disc.

Another object of this invention is to provide a compact disc cleaner which is simple to use, provides good results, will not damage the compact disc and provides quick and easy cleaning thereof.

A further object of this invention is to provide a mechanical cleaning arrangement for a compact disc which calls for minimal manual operation.

An additional object of this invention is to provide a motor-driven mechanical arrangement for cleaning a compact disc.

Various other objects, advantages and features of the present invention will become readily apparent from the ensuing detailed description, and the novel features will be particularly pointed out in the appended claims.

SUMMARY OF THE INVENTION

In accordance with this invention, cleaning apparatus is provided for a compact disc, the apparatus including a housing, a rotatable carrier disposed in the housing, a cleaning pad fastened to the carrier for contacting the surface of the compact disc, a drive element for rotatably driving the carrier about an axis of rotation and for concurrently causing that axis of rotation to move along a predetermined path, and a constraint which constrains the path of movement of the carrier axis to a curved path, whereby the carrier and its cleaning pad exhibit planetary motion such that the cleaning pad concurrently rotates and revolves.

In one embodiment of this invention, the drive element is manually driven; and in another embodiment, this drive element is motor-driven.

As one aspect, the housing includes a base for supporting the compact disc and a cover that moves between open and closed positions, with the interior of the cover functioning to support the carrier and its cleaning pad.

As another aspect of this invention, the drive element comprises a drive wheel rotatable about an axis fixed to the aforementioned cover, the drive wheel being coupled to the carrier so as to cause the latter to rotate and revolve as the drive wheel rotates. In one embodiment, the coupling between the carrier and the drive wheel comprises a fastener by which the axis of rotation of the carrier is fastened to a fixed radial location on the drive wheel, whereby this axis of rotation follows a circular path as the drive wheel rotates. The periphery of the carrier engages the aforementioned constraint, as by meshing tooth engagement therebetween or by frictional engagement, such that as the carrier revolves about the rotational axis of the drive wheel, the carrier also rotates about its own axis of rotation. Alternatively, the engagement of the carrier with the drive wheel may be achieved by meshing engagement between teeth provided on the periphery of the drive wheel and teeth provided on the periphery of the carrier. In place of the aforementioned teeth, frictional engagement may be utilized, as by providing the drive wheel and carrier with peripheral rubber tires.

In the embodiment wherein the carrier and drive wheel are in peripheral contact with each other, the axis of rotation of the carrier may be guided by a suitable guide groove provided on the inner surface of the cover.

BRIEF DESCRIPTION OF THE DRAWINGS

The following detailed description, given by way of example but not intended to limit the present invention solely to the specific embodiments described, may best be understood in conjunction with the accompanying drawings in which:

FIG. 2 is a top plan view of the cleaning apparatus;

FIG. 3 is a perspective view representing a motor-driven embodiment of this invention;

DETAILED DESCRIPTION OF CERTAIN PREFERRED EMBODIMENTS

Figure 1:
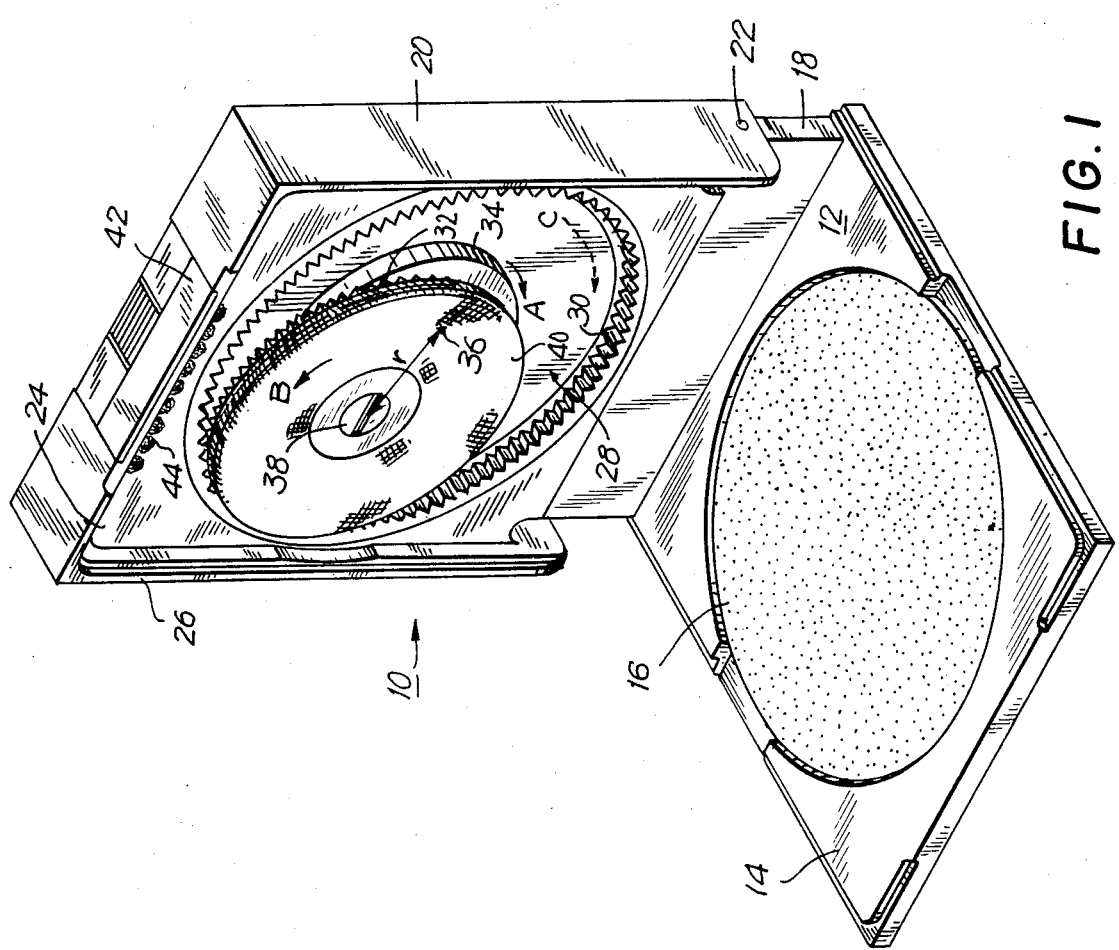
FIG. 1 is a perspective view of one embodiment of the cleaning apparatus in accordance with the present invention.

Referring now to the drawings, wherein like reference numerals are used throughout, and in particular to FIG. 1, there is illustrated a perspective view of one embodiment of compact disc cleaner 10 in accordance with this invention. The compact disc cleaner is comprised of a housing 12 formed of a base 14 which includes a central, indented support table 16 for supporting a compact disc to be cleaned. Base 14 is provided with a curb 18 to which a cover 20 is hingedly fastened at hinge 22. It is appreciated, therefore, that cover 20 may pivot about hinge 22 between a closed position (not shown), whereby cover 20 overlies base 14 and conceals the compact disc that may be supported on support table 16, and the open position illustrated in FIG. 1.

Cover 20 is provided with a peripheral frame 26 which provides a reasonably good dust-free environment within housing 12 when cover 20 is closed. Inner surface 24 of cover 20 mechanically supports the cleaning apparatus of the present invention, this cleaning apparatus generally comprising an epicyclic gear 28. More particularly, the epicyclic gear includes an internal stationary gear 30, which functions as a constraint (to be described below), a planetary gear 32, which functions as a carrier (also to be described below) and a drive wheel 34.

Drive wheel 34 is provided with a drive wheel axis 36 that is rotatably secured in cover 20. As will be described below, drive wheel axis 36 may be fixed to a further wheel seated upon the outer surface of cover 20, this further wheel being driven, either manually or by means of a motor, so as to rotate drive wheel axis 36. Planetary gear, or carrier, 32 is rotatable about its own axis 38, sometimes referred to herein merely as the carrier axis and other times referred to herein as the planetary gear axis. Axis 38 is fixed to drive wheel 34 at a radial location outwardly of drive wheel axis 36. For convenience, FIG. 1 illustrates the location of axis 38 a radial distance r from drive wheel axis 36. Axis 38 may be suitably fastened to drive wheel 34 by conventional fastening means, such as a rivet, a screw, a pin, or the like. The precise construction of the fastening means is not critical to the present invention. Suffice it to say that it merely is necessary for the fastening of the carrier axis to the drive wheel to be of a type by which carrier 32 may rotate easily about its axis 38.

A replaceable cleaning pad 40 is removably secured to the surface of carrier 32 such that when cover 20 is closed, cleaning pad 40 is brought into contact with the surface of a compact disc supported on support table 16. The cleaning pad may be formed of chamois cloth or other suitable cleaning fabric.

In the embodiment illustrated in FIG. 1, epicyclic gear 28 is formed of an internal stationary gear 30 having teeth about the circular periphery thereof. These teeth are adapted to mesh or engage with mating teeth provided on the periphery of carrier 32.

It will be appreciated that, when drive wheel 34 rotates, such as in the direction represented by arrow A, carrier axis 38 rotates about drive wheel axis 36 in this same direction. However, the meshing engagement of the teeth provided on the periphery of carrier 32 with the teeth provided on internal stationary gear 30 rotatably drives the carrier about its axis 38 in the direction represented by arrow B. Furthermore, as carrier axis 38 rotates about drive wheel axis 36, carrier 32 moves along a predetermined, circular path in the direction represented by arrow C. Hence, as is conventional with epicyclic gears, carrier 32 concurrently rotates about its axis 38 and revolves about axis 36, the latter being recognized as an axis of revolution. Thus, epicyclic gear 28 is seen to be a planetary gear, and carrier 32 functions as a "planet" to rotate about its own axis and revolve about a "sun" formed of axis 36.

It is recognized that the meshing engagement between the teeth of carrier 32 and the teeth of internal stationary gear 30 results in the rotation of the carrier about axis 38 as that axis, in turn, revolves about drive wheel axis 36. Consequently, when cover 20 is closed, cleaning pad 40 undergoes the very same planetary motion as carrier 32, this planetary motion serving to clean the surface of the compact disc supported on support table 16.

FIG. 1 also illustrates a storage compartment 42 provided in frame 26 of cover 20, this storage compartment serving as a receptacle in which a cleaning brush 44 is stored. The purpose of brush 44 is to clean support table 16, and it is expected that the user of cleaner 10 will clean the support table from time to time to remove dust and other foreign particles therefrom. This improves the cleaning operation achieved by cleaning pad 40.

Although storage compartment 42 is illustrated herein as being provided in cover 20, it will be readily appreciated that, if desired, the storage compartment may be disposed at any suitable location in base 14. Furthermore, the storage compartment may be omitted, if desired; but it is preferred to provide brush 44, and this is readily achieved by the packaging illustrated herein.

A top view of cleaner 10 is illustrated in FIG. 2; and for the purpose of the present description it is assumed that cover 10 is formed of transparent material, such as transparent plastic. It is seen that drive wheel axis 36 extends through cover 20 to the outer surface thereof, and this axis 36, although rotatable in the cover, is fixed to a crank wheel 46. The crank wheel includes a foldable crank handle 48 which may be manually grasped and rotated by the user, thus rotating crank wheel 46 and drive wheel axis 36. As the drive wheel axis rotates by reason of the operation of crank handle 48, drive wheel 34 also rotates and, as should be clear from the foregoing discussion, carrier axis 38 likewise rotates in a circular path about drive wheel axis 36. As the carrier axis rotates, carrier 32 revolves about drive wheel axis 36; and the engagement between the periphery of carrier 32 and the internal stationary gear (or, as will be described, the internal constraint) causes the carrier to rotate about axis 38. Thus, carrier 32 undergoes planetary movement, with drive wheel axis 36 functioning as the "sun" of the planetary gearing system. Since cleaning pad 40 is secured to the surface of carrier 32, the cleaning pad likewise undergoes planetary movement for effective cleaning of the compact disc that is supported on support table 16.

Although the embodiment illustrated in FIG. 2 is provided with a crank 48 for the manual rotation of drive wheel 34, it is appreciated that crank wheel 46 may be driven by an electric motor, a spring-wound motor, or the like. FIG. 3 is a schematic representation, shown in perspective, of the use of such a motor 50 coupled, by means of a suitable transmission 52, such as a simple drive shaft, to crank wheel 46. If desired, transmission 52 may include a gearing arrangement, drive belts, or the like. As a further alternative, motor 50 may be disposed on the outer surface of cover 20 with its drive shaft substantially parallel to the cover, this drive shaft being in frictional contact with a radially outward location of crank wheel 46 to rotate the latter about axis 36. Other mechanical coupling arrangements and assemblies may be used to drive crank wheel 46 by motor 50.

Figure 4:
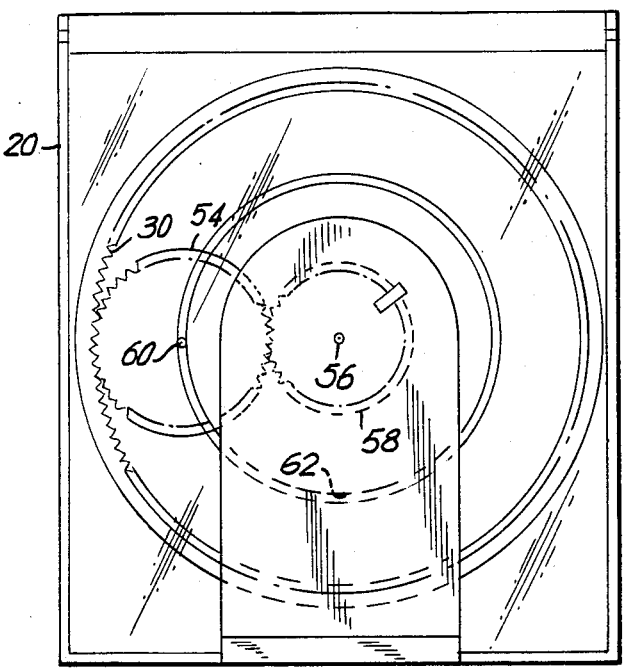
FIG. 4 is a top plan view of yet another embodiment of this invention.

FIG. 4 is a plan view of the inner surface 24 of cover 20 in which yet another embodiment of the present invention is illustrated. In this embodiment, epicyclic gear 28 is provided with internal stationary gear 30, as before, and with a carrier gear 58. The carrier gear rotates about its rotary axis 60 which, in this embodiment, is constrained in a guide track, or groove, 62 which, preferably, is formed as a circular track concentric with and internally of internal stationary gear 30. Carrier gear 58 is peripherally driven by a drive gear 54 that is rotatable about its drive shaft 56. Drive gear 54 may be manually rotated, as by a crank and crank wheel similar to the embodiment described above with respect to FIG. 2, or drive gear 54 may be motor driven. Both drive gear 54 and carrier 58 are provided with teeth about the respective peripheries thereof, these teeth being in meshing engagement such that as drive gear 54 rotates, rotary motion is imparted therefrom to carrier gear 58, the latter rotating about its rotary axis 60. As carrier 58 rotates, the teeth disposed on the periphery thereof engage the teeth of internal stationary gear 30, resulting in the "walking" of carrier gear 58 about the internal stationary gear. Guide track 62 serves to guide rotary axis 60 as the carrier gear "walks" along the internal stationary gear, whereupon the carrier gear revolves about drive shaft 56. Hence, in the embodiment illustrated in FIG. 4, carrier gear 58 undergoes planetary movement by which it rotates about its rotary axis 60 and concurrently revolves about drive shaft 56. The meshing engagement between the teeth of internal stationary gear 30 and carrier gear 58 results in the revolution of the carrier gear, and this revolution is guided, in part, by such meshing engagement and in part by the guide path provided by guide track 62.

Figure 5:
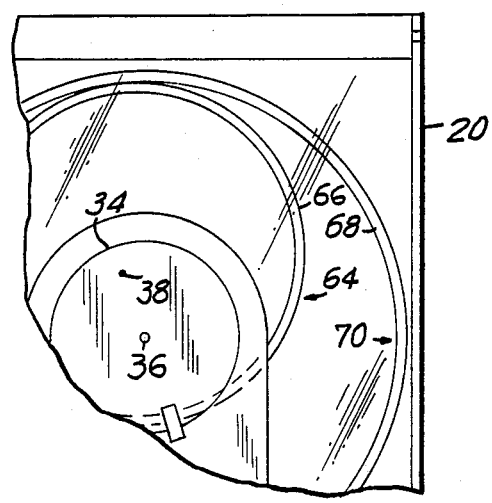
FIG. 5 is a top plan view of a portion of a further embodiment of this invention.

Another embodiment of the present invention is illustrated in the partial plan view shown in FIG. 5. This embodiment is similar to that illustrated in FIG. 1, except that frictional engagement between the carrier and the internal stationary gear is provided rather than the aforementioned meshing tooth engagement. More specifically, the embodiment of FIG. 5 is provided with a carrier 64 having a friction tire 66, such as a rubber tire, disposed about the periphery thereof, this tire being in frictional engagement with a circular tire 68 provided on the interior of circular constraint 70. It is seen that circular constraint 70 performs a function analogous to that of internal stationary gear 30; and in the interest of brevity, further description of the embodiment illustrated in FIG. 5 is not provided. Suffice it to say that, as drive wheel 34 rotates (as before), carrier axis 38 likewise rotates about drive wheel axis 36; and the frictional engagement between tires 66 and 68 serves to rotate carrier 64 about its axis 38. Hence, carrier 64 undergoes planetary motion by which it rotates about axis 38 and concurrently revolves about axis 36.

Figure 6:
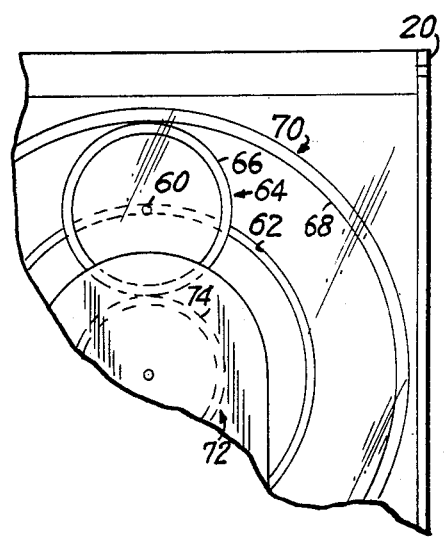
FIG. 6 is a top plan view of a portion of yet an additional embodiment of this invention.

Yet another embodiment of this invention is illustrated in partial plan view of FIG. 6. This embodiment is similar to that discussed above with respect to FIG. 4; except that here the epicyclic gear is provided with friction engaging elements in the form of, for example, rubber tires, in place of the previously described gear teeth. Thus, drive wheel 72 is provided with a rubber tire 74 on its periphery, this tire being in frictional engagement with rubber tire 66 disposed on the periphery of carrier 64. Hence, the rotation of drive wheel 72 causes carrier 66 to rotate about its rotary axis 60; and the frictional engagement between tire 66 of the carrier and tire 68 of circular constraint 70 causes the rotating carrier to advance about the circular constraint. As in the embodiment of FIG. 4, guide track 62 provides a circular guide path for rotary axis 60, thus enabling the latter to rotate about the drive wheel axis. It is seen that carrier 64 thus exhibits planetary movement as a result of the frictional peripheral (or rim) driving force exerted thereon by drive wheel 72. Hence, carrier 64 rotates about its rotary axis and concurrently revolves about the "sun" constituted by drive wheel axis 36. Accordingly, when the cleaning head is secured to carrier 64, the planetary movement of that cleaning pad results in effective cleaning of the surface of the compact disc disposed within housing 12.

While the present invention has been particularly shown and described with reference to various embodiments, it will be readily appreciated by those of ordinary skill in the art that various changes and modifications may be made without departing from the spirit and scope of the invention. For example, other frictional members, such as felt strips, may be used in place of the rubber tires illustrated in FIGS. 5 and 6. Also, carrier 32 as well as carrier 64 may be driven by means other than the illustrated drive wheels. For example, for manual drive, a crank or other manually rotatable element may be provided directly on the carrier, for instance, the crank may be secured to the carrier axis, and rotatable so as to revolve the carrier about an axis of revolution, as described above. Contact between the carrier and the circular constraint formed of, for example, internal stationary gear 30 or circular tire 68, will cause the carrier to rotate about its rotary axis. A suitable motor and transmission may be coupled to the carrier in place of the aforementioned crank to achieve planetary movement thereof. As yet a further embodiment, rather than providing an internal stationary gear 30 or circular constraint 70 which circumscribes the carrier, a smaller, fixed circular gear, or fixed, tired disc may be provided at the axis of revolution of the carrier, this gear or disc being in peripheral contact with the carrier so as to cause that carrier to rotate as it concurrently revolves. The small gear or disc may be thought of as the "sun" about which the carrier revolves.

It is intended that the appended claims be interpreted as including the foregoing as well as other changes and modifications.

What is claimed is:

1. Cleaning apparatus for a compact disc comprising a housing; a rotatable carrier disposed in said housing and having an axis of rotation; a cleaning pad fastened to said carrier and adapted to contact the surface of a compact disc to clean the same; drive means coupled to said carrier for driving said carrier to rotate about the axis of rotation thereof and concurrently to cause said axis of rotation to move along a predetermined path; said drive means comprising a drive wheel rotatable about an axis thereof; means coupled to said drive wheel for rotating said drive wheel about said axis thereof; coupling means for coupling said drive wheel to said carrier to rotate the latter about said axis of rotation and to cause said carrier to revolve about the drive wheel axis; said coupling means including fastening means for fastening the axis of rotation of said carrier to a fixed location on said drive wheel radially outward of the drive wheel axis; and means for constraining said path of movement of said axis of rotation to a curved path relative to an axis of revolution, whereby said carrier and said cleaning pad concurrently rotate about said axis of rotation and revolve about said axis of revolution.

2. The cleaning apparatus of claim 1 wherein said housing includes a base for supporting a compact disc and a cover movable with respect to said base between open and closed positions; and wherein said carrier and cleaning pad are supported by and movable with said cover.

3. The cleaning apparatus of claim 2 wherein said cover is hingedly coupled to said base.

4. The cleaning apparatus of claim 2 wherein said housing further includes a storage compartment provided in said base; and a cleaning brush stored in said storage compartment and accessible by a user for removal from said storage compartment.

5. The cleaning apparatus of claim 2 wherein said housing further includes a storage compartment provided in said cover; and a cleaning brush stored in said storage compartment and accessible by a user for removal from said storage compartment.

6. The cleaning apparatus of claim 1 wherein said drive means is manually operated.

7. The cleaning apparatus of claim 6 wherein the combination of said carrier, said drive means and said means for constraining comprise an epicyclic gear.

8. The cleaning apparatus of claim 1 wherein said means coupled to said drive wheel for rotating said drive wheel comprises a handle accessible from outside said housing and means for mechanically coupling said handle to said drive wheel to rotate the latter about said axis thereof.

9. The cleaning apparatus of claim 1 wherein said constraining means comprises circular engaging means defining a circumference engaged by the periphery of said carrier such that the rotation of said carrier about said axis of rotation concurrently urges said carrier to move around said circumference.

10. The cleaning apparatus of claim 1 wherein said means coupled to said drive wheel for rotating said drive wheel comprises motor drive means and transmission means for coupling motive force generated by said motor to said drive wheel to rotate the latter about said axis thereof.

11. The cleaning apparatus of claim 1 wherein said drive means is motor driven.

12. Cleaning apparatus for a compact disc comprising a housing; a rotatable carrier disposed in said housing and having an axis of rotation; a cleaning pad fastened to said carrier and adapted to contact the surface of a compact disc to clean the same; drive means coupled to said carrier for driving said carrier to rotate about the axis of rotation thereof and concurrently to cause said axis of rotation to move along a predetermined path; said drive means comprises a drive wheel rotatable about an axis thereof; means coupled to said drive wheel for rotating said drive wheel about said axis thereof; coupling means for coupling said drive wheel to said carrier to rotate the latter about said axis of rotation and to cause said carrier to revolve about the drive wheel axis; said coupling means comprises peripheral engaging means for engaging the periphery of said drive wheel with the periphery of said carrier, such that rotation of said drive wheel causes the carrier to rotate about said axis of rotation and means for constraining said path of movement of said axis of rotation to a curved path relative to an axis of revolution, whereby said carrier and said cleaning pad concurrently rotate about said axis of rotation and revolve about said axis of revolution.

13. The cleaning apparatus of claim 12 wherein said constraining means comprises circular engaging means defining a circumference engaged by the periphery of said carrier such that the rotation of said carrier about said axis of rotation concurrently urges said carrier to move around said circumference.

14. The cleaning apparatus of claim 13 wherein said peripheral engaging means comprises first teeth disposed about the periphery of said drive wheel and second mating teeth disposed about the periphery of said carrier; and wherein said constraining means comprises additional teeth circumscribing both said drive wheel and said carrier and mating with said second teeth such that the rotation of said carrier about said axis of rotation concurrently urges said carrier to advance along said additional teeth.

15. The cleaning apparatus of claim 13 wherein said peripheral engaging means comprise friction tires disposed on the peripheries of the drive wheel and the carrier, respectively, and wherein said constraining means comprises an additional friction tire circumscribing both said drive wheel and said carrier and frictionally engaging the friction tire on said carrier, such that the rotation of said carrier about said axis of rotation thereof concurrently urges said carrier to advance along the additional friction tire.

16. Cleaning apparatus for a compact disc comprising a base for receiving a compact disc; a cover movable with respect to said base between open and closed positions; crank means having a handle extending from said cover and externally accessible by a user; a drive wheel supported by said cover and coupled to said crank means, said drive wheel being rotatable about a fixed axis; a planetary gear rotatable about an axis, the axis of said planetary gear being fastened to said drive wheel radially outward from said fixed axis; an internal stationary gear surrounding said planetary gear and meshing therewith to provide a circular guide path to be followed by said planetary gear when the latter rotates about the axis thereof; and a cleaning pad secured to and rotatable and revolvable with said planetary gear such that, when a compact disc is received by said base and said cover is in said closed position, said cleaning pad cleans the surface of said compact disc.

17. Cleaning apparatus for a compact disc comprising a housing; a rotatable carrier disposed in said housing and having an axis of rotation; a cleaning pad fastened to said carrier and adapted to contact the surface of a compact disc to clean the same; drive means coupled to said carrier for driving said carrier to rotate about the axis of rotation thereof and concurrently to cause said axis of rotation to move along a predetermined path; said drive means comprises a drive wheel rotatable about an axis thereof; means coupled to said drive wheel for rotating said drive wheel about said axis thereof; coupling means for coupling said drive wheel to said carrier to rotate the latter about said axis of rotation and cause said carrier to revolve about the drive wheel axis; said coupling means comprises peripheral engaging means for engaging the periphery of said drive wheel with the periphery of said carrier, such that rotation of said drive wheel causes the carrier to rotate about said axis of rotation; and means for constraining said path of movement of said axis of rotation to a curved path relative to an axis of revolution, said constraining means comprises circular engaging means defining a circumference engaged by the periphery of said carrier such that the rotation of said carrier about said axis of rotation concurrently urges said carrier to move around said circumference whereby said carrier and said cleaning pad concurrently rotate about said axis of rotation and revolve about said axis of revolution.

18. The cleaning apparatus of claim 17 wherein said peripheral engaging means comprises first teeth disposed about the periphery of said drive wheel and second mating teeth disposed about the periphery of said carrier; and wherein said constraining means comprises additional teeth circumscribing both said drive wheel and said carrier and mating with said second teeth such that the rotation of said carrier about said axis of rotation concurrently urges said carrier to advance along said additional teeth.

19. The cleaning apparatus of claim 17 wherein said peripheral engaging means comprise friction tires disposed on the peripheries of the drive wheel and the carrier, respectively, and wherein said constraining means comprises an additional friction drive circumscribing both said drive wheel and said carrier and frictionally engaging the friction tire on said carrier, such that the rotation of said carrier about said axis of rotation thereof concurrently urges said carrier to advance along the additional friction tire.

20. Cleaning apparatus for a compact disc comprising a housing; a rotatable carrier disposed in said housing and having an axis of rotation; a cleaning pad fastened to said carrier and adapted to contact the surface of a compact disc to clean the same; the carrier rotatably coupled to a drive means rotatable about a fixed axis; the carrier being coupled to said drive means radially outward from said fixed axis for driving said carrier to rotate about the axis of rotation thereof and concurrently to cause said axis of rotation to move along a predetermined path; an internal stationary gear surrounding said carrier and meshing therewith to provide a circular guide path to be followed by said carrier when the latter rotates about the axis thereof; and a cleaning pad secured to and rotatable and revolvable with said carrier such that, when a compact disc is received within the housing, the cleaning pad cleans the surface of the compact disc.

21. The cleaning apparatus of claim 20 wherein said housing includes a base for supporting a compact disc and a cover movable with respect to said base between open and closed positions; and wherein said carrier and cleaning pad are supported by and movable with said cover.

22. The cleaning apparatus of claim 21 wherein said cover is hingedly coupled to said base.

23. The cleaning apparatus of claim 20 wherein said drive means is manually operated.

24. The cleaning apparatus of claim 20 wherein said drive means is motor driven.

* * * * *